United States Patent
Lu

[11] Patent Number: 5,896,622
[45] Date of Patent: Apr. 27, 1999

[54] HINGE DEVICE

[76] Inventor: Sheng-Nan Lu, No. 174, Chunying St., Shulin Chen, Taipei Hsien, Taiwan

[21] Appl. No.: 09/024,791

[22] Filed: Feb. 17, 1998

[51] Int. Cl.[6] .................................................. E05C 17/64
[52] U.S. Cl. ............................... 16/342; 16/337; 16/331
[58] Field of Search .............................. 16/342, 337, 338, 16/339, 307, 306, 352, 353, 331, 316, 328, 329, 330, 332

[56] References Cited

U.S. PATENT DOCUMENTS

| | | | |
|---|---|---|---|
| 4,489,974 | 12/1984 | Warhol | 16/342 |
| 4,986,507 | 1/1991 | Chiang | 16/342 |
| 5,018,244 | 5/1991 | Hino | 16/342 |
| 5,146,805 | 9/1992 | Harkrader et al. | 16/342 |
| 5,333,356 | 8/1994 | Katagiri | 16/342 |
| 5,566,048 | 10/1996 | Esterberg | 16/342 |

*Primary Examiner*—Chuck Y. Mah
*Attorney, Agent, or Firm*—Peterson Wicks Nemer & Kamrath, P.A.

[57] ABSTRACT

A hinge device has a first portion defined therein a channel, a lateral slot and a longitudinal slot and a second portion having an axis formed therewith and rotatably received within the channel of the first portion. The lateral slot and the longitudinal slot of the first portion are able to provide the hinge device of the invention recovery force of dual orientations according to various orientation requirement of load.

6 Claims, 4 Drawing Sheets

HINGE DEVICE

FIELD OF THE INVENTION

The present invention generally relates to a hinge device, and more particularly to a hinge device with dual seats so as to provide required allocating force to various resilient members mounted therein.

BACKGROUND OF THE INVENTION

Hinge devices have been used as a connecting media between a monitor and a key board of a notebook computer for a long time. Most hinge devices do have sufficient effect to provide necessary torque between the monitor and the key board when the notebook computer is opened to display the monitor However, such a conventional hinge device suffers from a major drawback. The hinge device generally has a first connecting stem and a second connecting stem rotatable in relation to the first connecting stem. The hinge device further has at least one resilient member compressibly mounted between the first connecting stem and the second connecting stem. Due to the orientation of the hinge device is different from one another on account of the usage of the objects the hinge device being attached to, manufacturer will have to have a lot of inventory stocked in the ware house to cope with the orientation change in different situation, which often causes a waste in material, and that is crucial in the modern efficiency-conscious.

Thus, a hinge device constructed in accordance with the present invention tends to mitigate and/or obviate the aforementioned problems.

SUMMARY OF THE INVENTION

The main objective of the invention is to provide a hinge device which is simple in structure, easy to be manufactured and efficient in performance.

In accordance with one aspect of the invention, the hinge device comprises a first portion having a first connecting stem integrally formed therewith and a second portion partially and rotatably received within the first portion. The second portion has a second connecting stem integrally extending out therefrom and an inserted part extending opposite to the second connecting stem thereof. The first portion longitudinally defines therein a channel, a pair of lateral slots and a longitudinal slot defined in an inner periphery defining first channel and in communication with the channel. With such a constructed first portion of the hinge device, a first resilient member providing the hinge device of the invention a lateral recoil force is able to be securely received within the lateral slot, and a second resilient member providing the hinge device of the invention a longitudinal recoil force may also be able to be received within the longitudinal slot. Therefore, the hinge device of the present invention is able to cope with the variety of orientations of the objects to be applied to.

Other objects, advantages and novel features of the invention will become more apparent from the following detailed description when taken in conjunction with the accompanying tools.

BRIEF DESCRIPTION OF THE DRAWINGS

The present invention will now be better understood with reference to the following tools, wherein.

DETAILED DESCRIPTION OF THE PREFERRED EMBODIMENT

Figure 1:
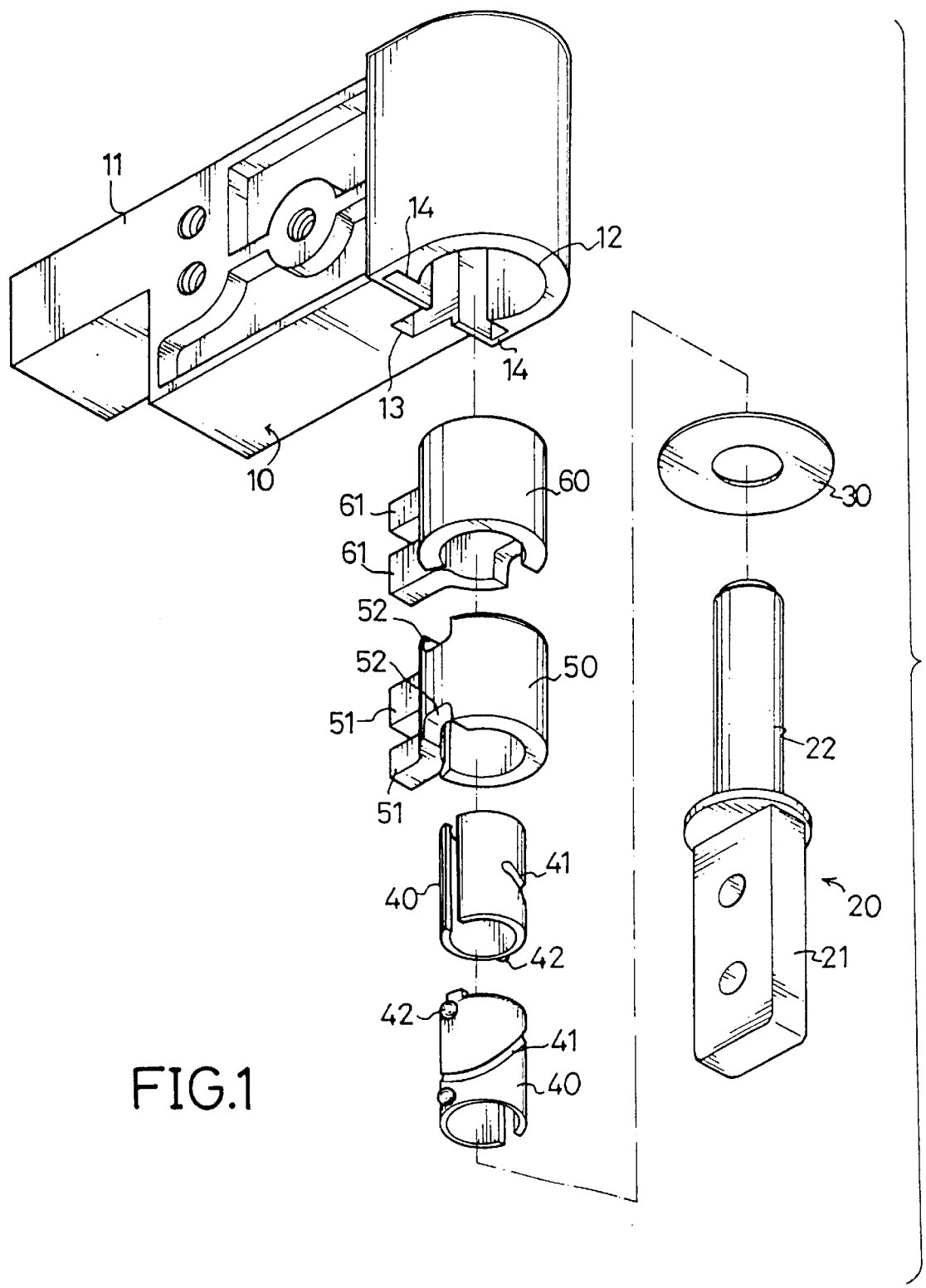
FIG. 1 is an exploded perspective view of a preferred embodiment of a hinge deconstructed in accordance with the present invention.

Referring to FIG. 1, a hinge device of the invention comprises a first portion 10 having a first connecting stem 11 integrally extending out therefrom and a channel 12 defined therein, at least a hollow first resilient member 50, a hollow second resilient member 60 respectively and rotatably received within the channel 12 of the first portion 10, at least two identical hollow sleeves 40 securely and respectively inserted into the resilient members 50, 60, a washer 30 and a second portion 20 having a second connecting stem 21 and an axis 22 integrally extending out therefrom. The first portion 10 further has a lateral slot 13 defined in communication with the channel 12 and a longitudinal slot 14 also in communication with the channel 12.

It is notable that since the two resilient members 50, 60 and the two sleeves 40 are in conventional structure and bear the same function as prior art, detailed description thereof is omitted. However, a key point between the first resilient members 50 and the second resilient member 60 is that their application orientation is in the opposite direction.

Figure 2:
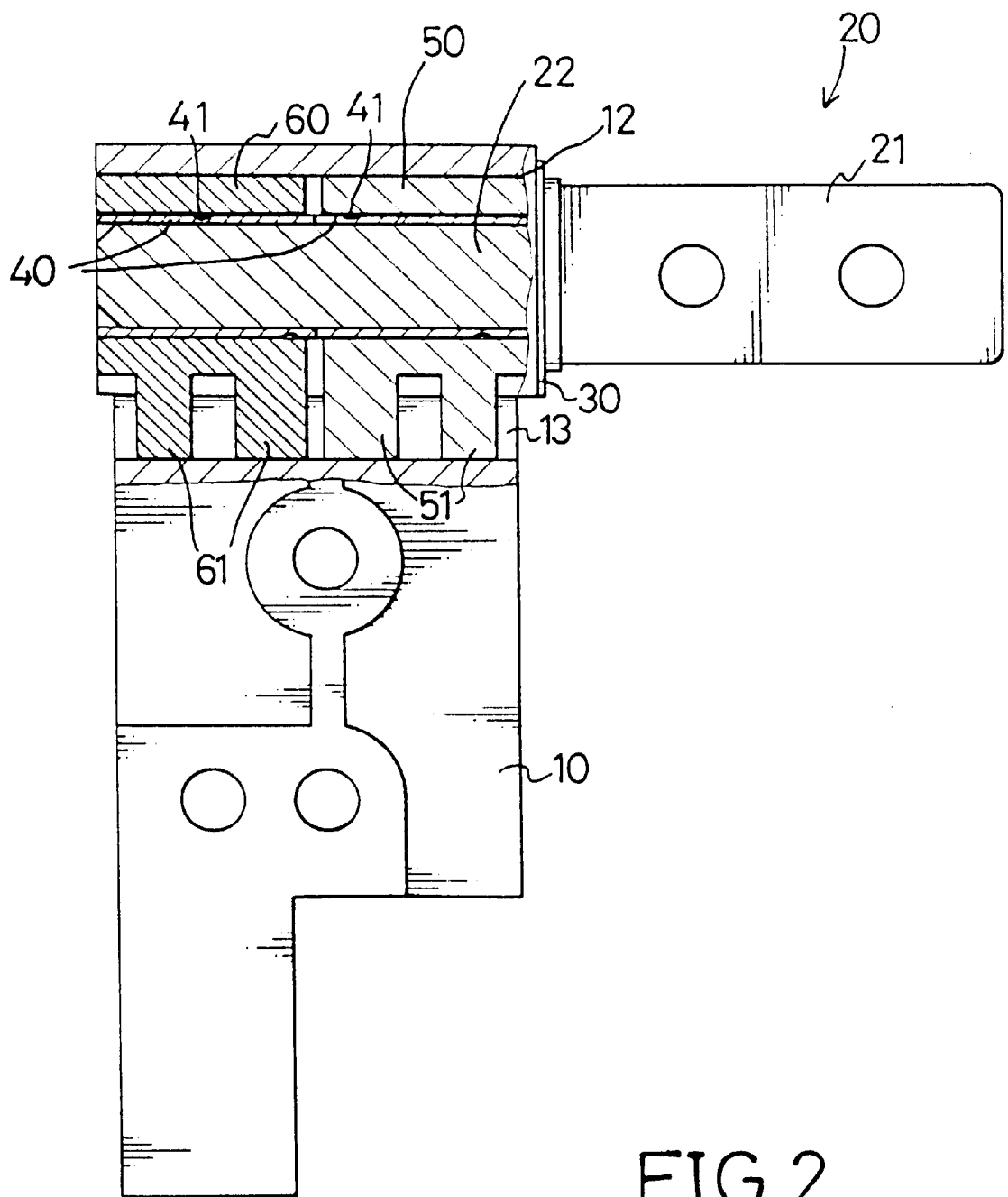
FIG. 2 is a partial cross-section plane view of the hinge device assembled with a first resilient member.
Figure 3:
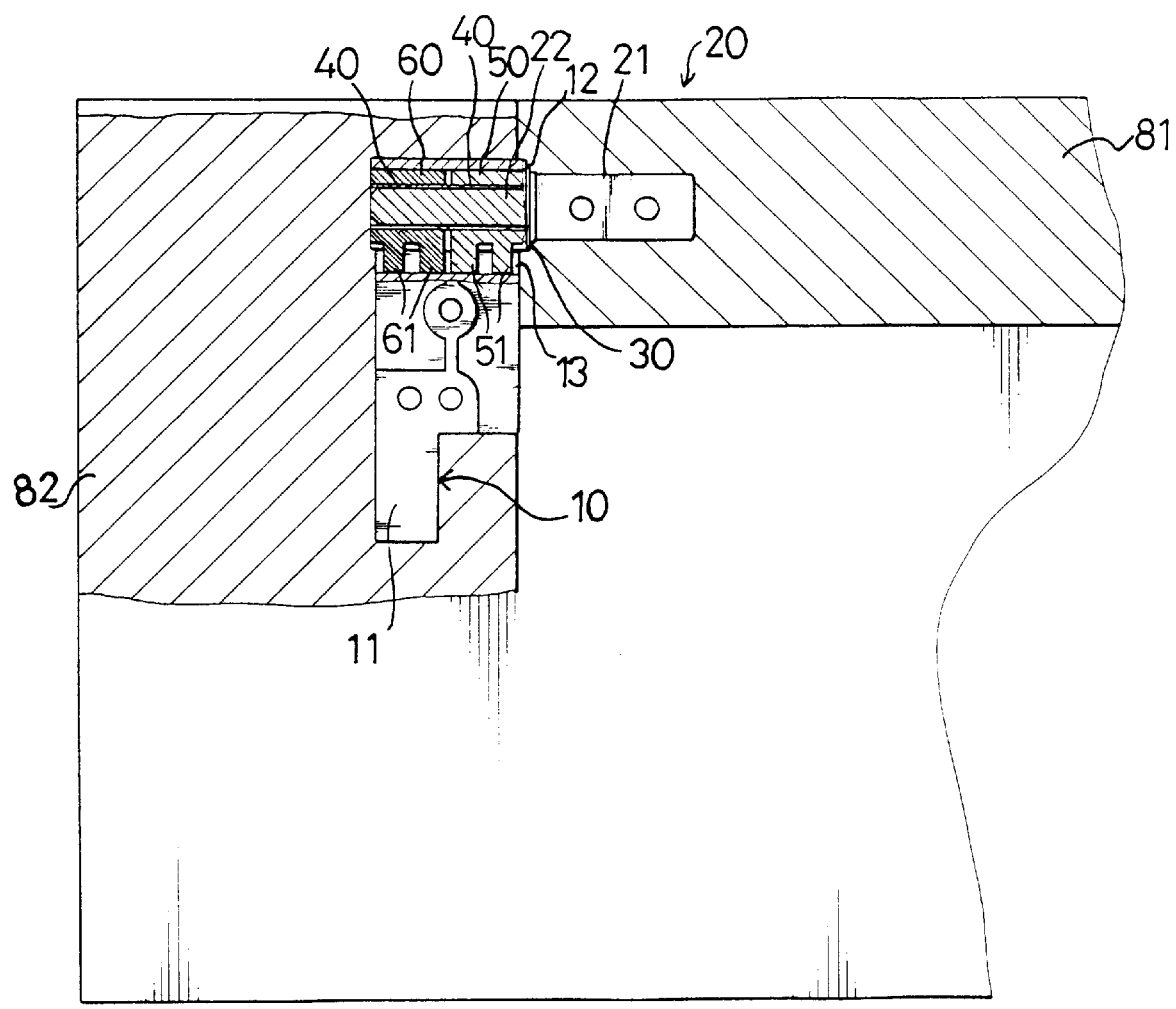
FIG. 3 is a schematic view showing the hinge device in application.

Referring to FIG. 2, and taking FIG. 1 for reference, when the first resilient member 50 and the second resilient member 60 are inserted into the channel 12 of the first portion 10, distal ends 51, 61 of the first resilient member 50 and the second resilient member 60 are respectively received within the lateral slot 13. Two corresponding cutouts 52 are defined in a periphery of the first resilient member 50 so that two protrusions 42 formed on an outer periphery of one of the two sleeves 40 are able to be respectively received within one of the corresponding cutout 52 to position the first resilient member 50 in place when one of the two sleeves 40 and the first resilient member 50 are assembled. In this arrangement, when both the first connecting stem 11 and the second stem 21 of the respective first portion 10 and the second portion 20 are securely attached to a load, for example a monitor 81 or a main frame 82 of a notebook computer as shown in FIG. 3, the first resilient member 50 and the second resilient member 60 are thus able to provide required recovery force no matter whether the notebook computer is about to be opened to display the monitor 81 or the computer is about to be closed to shut the monitor 81.

Figure 4:
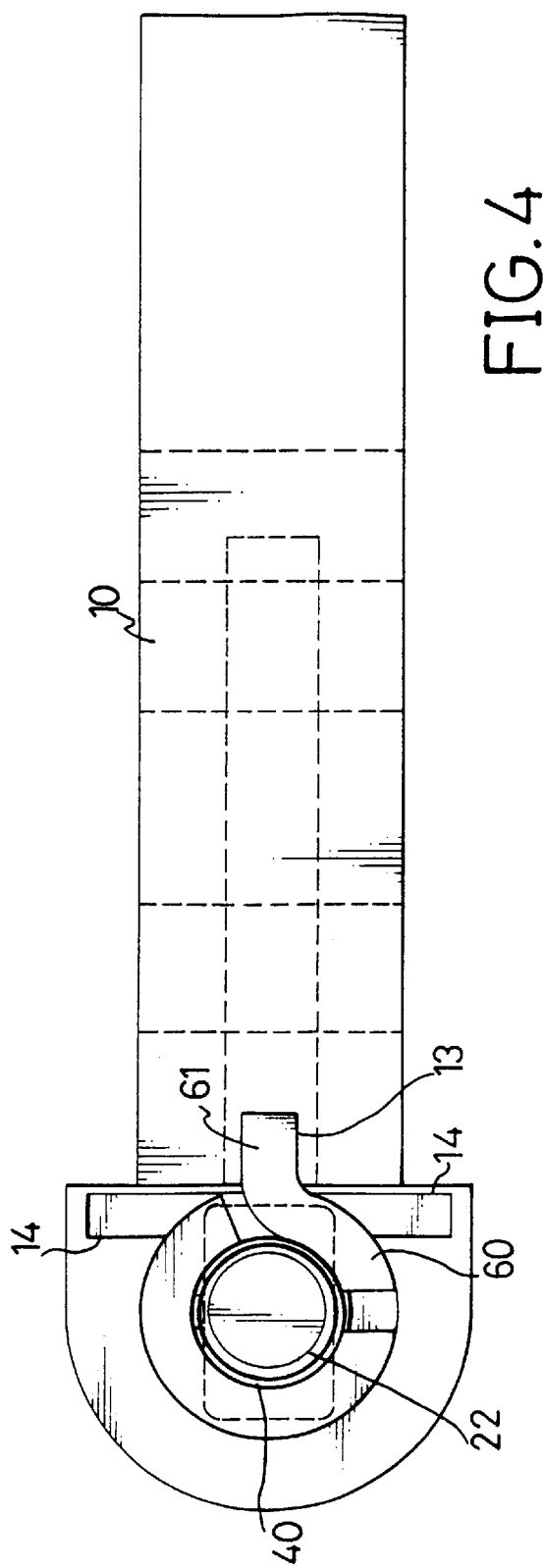
FIG. 4 is a rear view of the hinge device as shown in FIG. 2.

FIG. 4 is a rear view showing a state between the second resilient member 60 received within the lateral slot 13 of the first portion 10 of the present invention.

However, due to the orientation change of the load and accordingly the requirement of resilient member different from the first and the second resilient members 50, 60 discussed above, a new set of resilient member is necessary to fulfill the needs.

Figure 5:
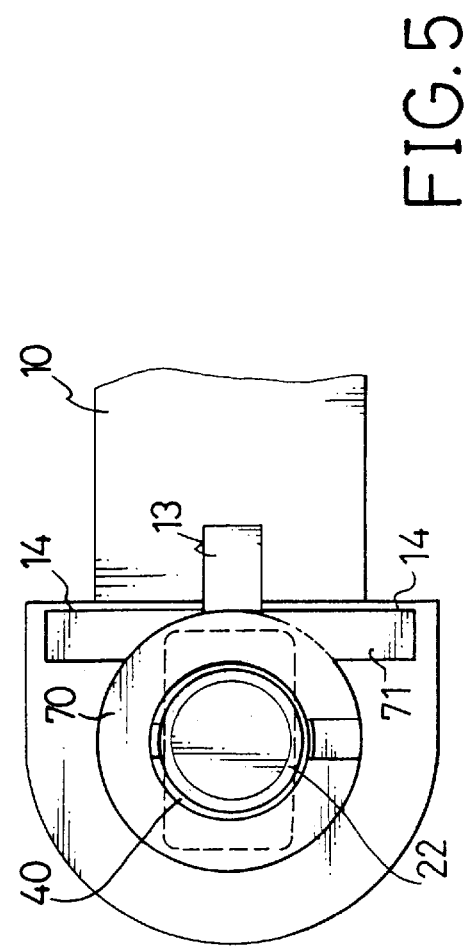
FIG. 5 is a rear view showing the hinge device incorporating with a second resilient member.

Referring to FIG. 5, a new set of resilient members 70 capable of providing longitudinal recovery force to the hinge device is able to be received within the channel 12 of the first portion 10 of the hinge device. It is noted that distal ends 71 of the resilient members 70 are securely received within the longitudinal slot 14 to cope with the orientation change of the load.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying tools shall be interpreted as illustrative and not in a limiting sense.

What is claimed is:

1. A hinge device comprising:

a first portion having a first connecting stem integrally extending out therefrom, a channel defined therein, a lateral slot defined in a periphery defining said channel and a longitudinal slot defined in communication with said channel;

a second portion partially and rotatably received within said channel of said first portion and having a second connecting stem integrally extending out therefrom and an axis formed with said second connecting stem and extending out opposite to said second connecting stem;

at least one resilient member having distal end securely received within said lateral slot of said first portion; and at least one sleeve securely received within said resilient member and having said axis of said second portion rotatably received therein.

2. The hinge device as claimed in claim 1, wherein said sleeve has at least one protrusion formed on an outer periphery thereof.

3. The hinge device as claimed in claim 2, wherein said resilient member has a cutout defined therein to receive said protrusion therein.

4. A hinge device comprising:

a first portion having a first connecting stem integrally extending out therefrom, a channel defined therein, a lateral slot defined in a periphery defining said channel and a longitudinal slot defined in communication with said channel;

a second portion partially and rotatably received within said channel of said first portion and having a second connecting stem integrally extending out therefrom and an axis formed with said second connecting stem and extending out opposite to said second connecting stem;

at least one resilient member having distal end securely received within said longitudinal slot of said first portion; and at least one sleeve securely received within said resilient member and having said axis of said second portion rotatably received therein.

5. The hinge device as claimed in claim 4, wherein said sleeve has at least one protrusion formed on an outer periphery thereof.

6. The hinge device as claimed in claim 5, wherein said resilient member has a cutout defined therein to receive said protrusion therein.

* * * * *